(12) United States Patent
Sun et al.

(10) Patent No.: US 9,791,769 B2
(45) Date of Patent: Oct. 17, 2017

(54) DISPLAY SCREEN FILM, PREPARATION METHOD THEREFOR AND ENERGY SAVING METHOD

(71) Applicant: ZTE Corporation, Shenzhen (CN)

(72) Inventors: Wei Sun, Shenzhen (CN); Zhengwei Han, Shenzhen (CN)

(73) Assignee: XI'AN ZHONGXING NEW SOFTWARE CO.LTD, Xi'an (CN)

( * ) Notice: Subject to any disclaimer, the term of this patent is extended or adjusted under 35 U.S.C. 154(b) by 0 days.

(21) Appl. No.: 15/030,980

(22) PCT Filed: Apr. 21, 2014

(86) PCT No.: PCT/CN2014/075829
§ 371 (c)(1),
(2) Date: Apr. 21, 2016

(87) PCT Pub. No.: WO2014/180242
PCT Pub. Date: Nov. 13, 2014

(65) Prior Publication Data
US 2016/0259235 A1    Sep. 8, 2016

(30) Foreign Application Priority Data

Oct. 24, 2013    (CN) .......................... 2013 1 0507766

(51) Int. Cl.
*B32B 9/00*    (2006.01)
*G03B 21/62*    (2014.01)
(Continued)

(52) U.S. Cl.
CPC ............ *G03B 21/62* (2013.01); *C01B 31/022* (2013.01); *C03C 17/22* (2013.01);
(Continued)

(58) Field of Classification Search
CPC ............... Y10T 428/30; Y10S 977/742; C01B 31/022–31/0293; B82Y 30/00
(Continued)

(56) References Cited

U.S. PATENT DOCUMENTS 7,740,945 B2    6/2010    Chuang
7,842,380 B2    11/2010    Chuang
(Continued)

FOREIGN PATENT DOCUMENTS

CN    101360387 A    2/2009
CN    102321323 A    1/2012

OTHER PUBLICATIONS

Supplementary European Search Report in European application No. 14794448.2, dated Sep. 29, 2016.
(Continued)

*Primary Examiner* — Daniel H Miller
(74) *Attorney, Agent, or Firm* — Oppedahl Patent Law Firm LLC

(57) ABSTRACT

Disclosed are a display screen film and a preparation method therefor, and an energy saving method. The display screen film comprises an oriented carbon nanotube layer and a quartz glass layer, wherein the oriented carbon nanotube layer is located above the quartz glass layer, comprises an oriented growth carbon nanotube, and is configured to refract all incident light through the oriented growth carbon nanotube; the quartz glass layer is used for the carbon nanotube layer to grow orientately thereon, and is also used for absorbing the incident light so as to enable all the incident light to reach the oriented carbon nanotube layer.

7 Claims, 2 Drawing Sheets

(51) Int. Cl.
| | |
|---|---|
| *C01B 31/02* | (2006.01) |
| *C03C 17/34* | (2006.01) |
| *C03C 17/22* | (2006.01) |
| *B82B 3/00* | (2006.01) |
| *B82Y 20/00* | (2011.01) |

(52) U.S. Cl.
CPC ........ *C03C 17/3441* (2013.01); *B82B 3/0014* (2013.01); *B82Y 20/00* (2013.01); *C03C 2217/42* (2013.01); *C03C 2218/152* (2013.01); *C03C 2218/1525* (2013.01); *Y10S 977/742* (2013.01); *Y10S 977/844* (2013.01)

(58) Field of Classification Search
USPC ............................... 428/408; 423/447.1, 448
See application file for complete search history.

(56) References Cited

U.S. PATENT DOCUMENTS

| | | | |
|---|---|---|---|
| 2003/0122111 A1* | 7/2003 | Glatkowski ............ | B82Y 10/00 252/500 |
| 2003/0203139 A1* | 10/2003 | Ren ........................ | B82Y 10/00 428/34.3 |
| 2006/0204679 A1 | 9/2006 | Jones | |
| 2007/0082218 A1 | 4/2007 | Chuang | |
| 2007/0254146 A1 | 11/2007 | Chuang | |
| 2009/0272935 A1 | 11/2009 | Hata | |

OTHER PUBLICATIONS

S. Ahmad Mirbagheri et al: "Macroscopic Synthesis of Vertically Aligned Carbon Nanotubes Using Floating catalyst Chemical Vapor Deposition Method", Apanese Journal of Applied Physics, vol. 51, No. 1,Dec. 26, 2011 (Dec. 26, 2011), p. 015101, XP055298934, JPISSN: 0021-4922, D0I:10.1143/JJAP.51.015101.

Zeng Le-Y0ng et al: "Synthesis and growth mechanism of carbon nanotubes on different Substrates", Eng Cailiao Yu Qijan Xuebao—Journal of Functionalmaterials and Devices,Gai-Kan Bianjibu, Shanghai, CN, vol. 14, No. 4, Aug. 1, 2008 (Aug. 1, 2008),pp. 763-768XPO08181458,ISSN: 10G7-4252.

Zeng D et al: Deposition rate and morphology of carbon nanotubes at different positions in a CVD reactor Rare Metals—Xiyou Jinshu, Press of Metallurgical Industry, Beijing, CN, vol. 27, No. 6, Dec. 1, 2008 (Dec. 1, 2008), pp. 637-641, XP025847383,ISSN: 1001-0521 [retrieved on Dec. 1, 2008].

International Search Report in international application No. PCT/CN2014/075829, dated Jul. 22, 2014.

English Translation of the Written Opinion of the International Search Authority in international application No. PCT/CN2014/075829, dated Jul. 22, 2014.

Zhang, Xianfeng et al."Patterned Growth of Well aligned Carbon Nanotube Arrays on Quartz Substrates by Chemica Vapor Deposition" Journal of Inorganic Materials, vol. 3, No. 18, May 31, 2003,ISSN: 1000 324X, pp. 163-167.

* cited by examiner without film with film (a)

(b)

DISPLAY SCREEN FILM, PREPARATION METHOD THEREFOR AND ENERGY SAVING METHOD

TECHNICAL FIELD

The disclosure relates to the optical film energy saving technology, and in particular to a display screen film, a preparation method therefor and an energy saving method therewith.

BACKGROUND

At present, the development of electronic consumer goods has entered the intelligent big-display screen times; for example, users no longer are limited to making a call and sending a short message when using a mobile terminal such as mobile phone; more abundant applications lie in other functions of mobile terminal, for example, watching a video, taking a photograph, seeing blogs, chatting, navigation and so on. Using the mobile terminal having a big-display screen, users have a better visual effect and acquire more information; however, the endurance capability becomes the most important index for the performance of a mobile terminal.

At present, the screen of the mobile terminal with a big-display screen is of above 4 inches generally; most manufacturers need to provide a battery of at least 1500 mAh to maintain one-day usage of the mobile terminal, and a tablet computer needs to be provided with a higher-capacity battery. However, existing battery material limits the continuous increment of capacity; therefore, in order to save energy, optimization can be made to the screen of these electronic products.

The brightness of screen is an important part for energy consumption of an electronic product; specifically, the screen in standby mode and display mode will consume about 40% electricity; therefore, it is needed to optimize the brightness of screen, i.e., reduce the display brightness; however, this method is unbeneficial for users, only good display through a screen can let users' eyes watch comfortably and thus good usage experience can be ensured; therefore, the brightness cannot be reduced too much; in this way, energy saving need to be realized through a novel technology.

SUMMARY

In order to solve the above technical problem, the embodiments of the disclosure provide a display screen film, a preparation method therefor and an energy saving method therewith.

An embodiment of the disclosure provides a display screen film, including: a quartz glass layer and an orientated carbon nanotube layer, in which:

the orientated carbon nanotube layer is located on the quartz glass layer, comprises orientated grown carbon nanotubes and is configured to refract all incident light through the orientated grown carbon nanotubes; and the quartz glass layer is configured to enable the orientated carbon nanotube layer to grow on it and is used configured to absorb incident light and enable all the incident light to reach the orientated carbon nanotube layer.

An embodiment of the disclosure also provides a preparation method for a display screen film, including:

an orientated carbon nanotube layer is grown on a quartz glass layer;

the quartz glass layer absorbs incident light and enabling all the incident light to reach the orientated carbon nanotube layer, and the orientated carbon nanotube layer refracts all incident light.

In an embodiment, the orientated carbon nanotube layer may be grown on the quartz glass layer using hydrogen-free chemical vapour deposition.

In an embodiment, carbon nanotubes of the orientated carbon nanotube layer may have orientated growth directions of $90°±15°$.

In an embodiment, growing the orientated carbon nanotube layer on the quartz glass layer may be: vertically growing, on the quartz glass layer, carbon nanotubes for refracting all incident light.

In an embodiment, gaps between carbon nanotubes on the oriented carbon nanotube layer may have a size in the range of 400 nm to 700 nm.

In an embodiment, carbon nanotubes on the oriented nanotube layer may have a diameter in the range of 20 nm to 80 nm.

An embodiment of the disclosure further provides an energy saving method for a display screen film, including:

an orientated carbon nanotube layer is grown on a quartz glass layer;

the quartz glass layer having the orientated carbon nanotube layer grown thereon is formed into a display screen film and the display screen film is attached onto the surface of a display screen; the quartz glass layer absorbs the incident light from the surface of the display screen and enabling all the incident light to reach the orientated carbon nanotube layer; the orientated carbon nanotube layer refracts all the incident light and enables the light to emit out vertically after passing through the display screen film.

According to the display screen film, preparation method therefor and energy saving method therewith provided by the embodiments of the disclosure, an orientated carbon nanotube layer is grown on a quartz glass layer, so that the quartz glass layer can absorb incident light and enable all the incident light to reach the orientated carbon nanotube layer, and that the orientated carbon nanotube layer can refract all incident light absorbed by the quartz glass layer, thereby the light is enabled to emit out vertically after passing through the film, and energy is saved.

The quartz glass layer having the orientated carbon nanotube layer grown thereon is formed into a display screen film and attached onto the surface of a display screen, so that the quartz glass layer can absorb the incident light from the surface of the display screen and enable all the incident light to reach the orientated carbon nanotube layer; correspondingly, the orientated carbon nanotube layer can refract all the incident light and enable the light to emit out vertically after passing through the display screen film. In this way, energy saving can be achieved while brightness is not reduced and the endurance capability of mobile terminal can be improved.

DETAILED DESCRIPTION

At present, people use electronic products more and more frequently; battery capacity is the foundation for the endurance capability of electronic products; conventional battery development technology focuses on the material of battery, however, the breakthrough of new material has its own bottleneck. If, in another view, to change the original omni-directional 180-degree visual angle of light to a smaller scope almost perpendicular to a display screen, then in the condition that the whole screen brightness is reduced to ⅓ of the original brightness, users can percept a same brightness in the vertical angle of view as when the brightness is not reduced; in this way, the effect of energy saving of electronic products can be implemented from another way.

Based on the above consideration, the basic idea of the embodiment of the disclosure lies in: an orientated carbon nanotube layer is grown on a quartz glass layer; the quartz glass layer having the orientated carbon nanotube layer grown thereon is formed into an energy-saving display screen film and the display screen film is attached onto the surface of a display screen, so that the quartz glass layer absorbs the incident light from the surface of the display screen, and all the incident light is enabled to reach the orientated carbon nanotube layer; correspondingly, the orientated carbon nanotube layer refracts all the incident light, thus the light is enabled to emit out vertically after passing through the film.

Orientated grown carbon nanotubes of the orientated carbon nanotube layer grow vertically, so as to reduce the refraction light loss for the incident light from different angles; the quartz glass layer can ensure that the incident light absorbed from the display screen is made to reach the orientated carbon nanotube layer.

Here, the quartz glass layer has a strong transmission enhancement effect; therefore, the light emitted from the surface of the display screen has no loss when reaching gaps between the carbon nanotubes after passing through the quartz glass layer.

Here, the display screen might be a liquid crystal display.

Figure 1:
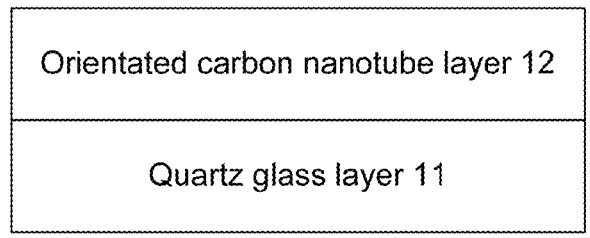
FIG. 1 is a schematic structural diagram of a display screen film according to an embodiment of the disclosure.

The display screen film provided by the embodiment of the disclosure, as shown in FIG. 1, includes: a quartz glass layer 11 and an orientated carbon nanotube layer 12, in which:

the orientated carbon nanotube layer 12 is located on the quartz glass layer 11, includes at least one orientated grown carbon nanotube and is configured to refract all incident light through the at least one orientated grown carbon nanotube;

the quartz glass layer 11 is configured to enable the orientated carbon nanotube layer 12 to grow on it, and is configured to absorb incident light and enable all the incident light to reach the orientated carbon nanotube layer 12.

Corresponding to the display screen film shown in FIG. 1, the embodiment of the disclosure also provides a preparation method for the film, including the following steps: an orientated carbon nanotube layer is grown on a quartz glass layer; the quartz glass layer absorbs incident light and enables all the incident light to reach the orientated carbon nanotube layer; and the orientated carbon nanotube layer refracts all the incident light.

Here, the orientated carbon nanotube layer may be grown on the quartz glass layer using hydrogen-free chemical vapour deposition; the growth means vertical growth on the quartz glass layer.

For example, $Fe(C_5H_5)_2$ is taken as a catalyst, acetylene as a carbon source, nitrogen as carrier gas, the ratio between the amount of the catalyst and the flow rate of the carbon source is about 1 g:100 mL/min, the flow rate ratio between the carrier gas and the carbon source is $N_2:C_2H_2=2:1$ to 4:1, the total flow rate of gas does not exceed 300 mL/min.

An existing quartz glass layer is taken as a substrate and it is put into a multi-temperature area horizontal column reactor, where a quartz tube is taken as a reaction chamber, and nitrogen (carrier gas) and acetylene (carbon source) arrive at two tube inlets of the reactor respectively.

The temperature of the reactor is increased, and when the reaction temperature increases to 700-800 degrees centigrade, the nitrogen and acetylene are directed into the reaction chamber with a flow rate of 100-300 mL/min for the nitrogen and a flow rate of 40-100 mL/min for the acetylene.

The morphology of the orientated carbon nanotube layer can be observed and analysed by a scanning electron microscope; when carbon nanotubes of the grown orientated carbon nanotube layer form columns with an orientated growth direction of 90 plus/minus 15 degrees; the supply of the carbon source is cut off first and then the supply of the carrier gas is cut off, and the temperature is reduced to the normal temperature, and then the quartz glass layer with the orientated carbon nanotube layer grown thereon is taken out.

The orientated growth directions of the carbon nanotubes are between 75 degrees and 105 degrees. These carbon nanotubes are arranged on the substrate with directivity; carbon nanotubes are arranged in a certain order, for example, equal-interval arrangement; slip gaps are formed between carbon nanotubes, with the gap size in a range of 400-700 nm, which exactly corresponds to the wavelength scope of visible light; the diameter of the carbon nanotube is in a range of 20 nm to 80 nm.

Figure 2:
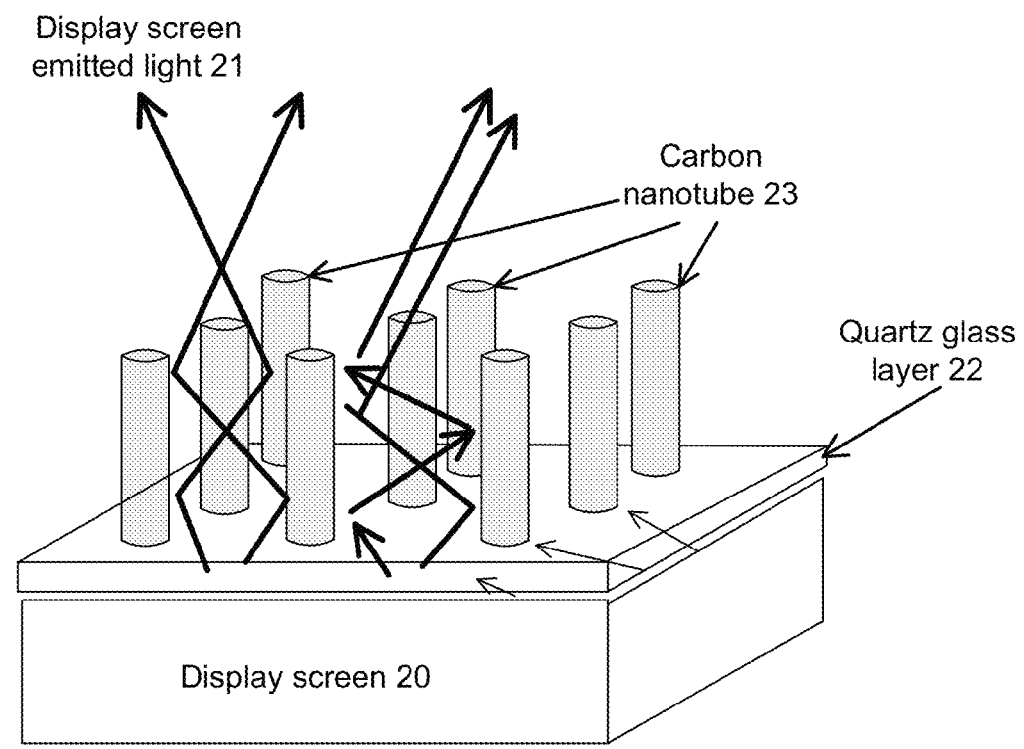
FIG. 2 is an effect diagram showing an action of a display screen film according to an embodiment of the disclosure.

The action effect of the display screen film provided by the embodiment of the disclosure is as shown in FIG. 2, specifically as follows: when the emitted light 21 from the display screen 20 reaches the lower surface of the orientated carbon nanotube layer through the quartz glass layer 22, small gaps between vertically grown carbon nanotubes 23 included in the orientated carbon nanotube layer, like many traps, make the light refracted for many times and then output from the upper surface of the orientated carbon nanotube layer as almost vertical light; in this way, this film has a guiding function for the light emitted from the screen. The film is formed by a quartz glass layer 22 which has carbon nanotube 23 vertically grown thereon. This film is attached on the surface of a display screen 20 to serve as a display screen film.

Figure 3:
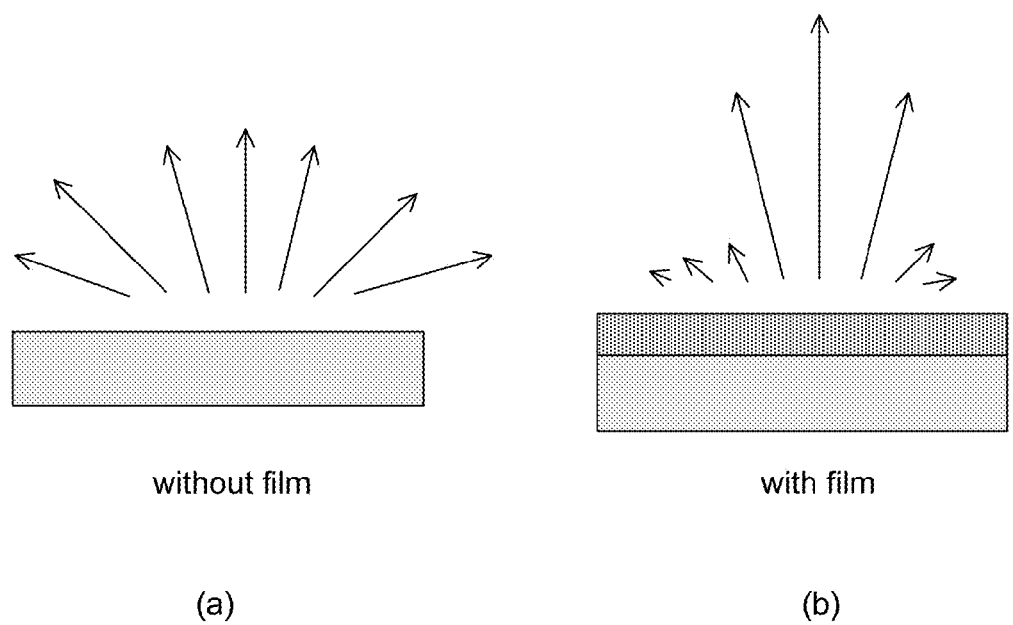
FIG. 3 is a comparison diagram showing situations with or without a display screen film according to the embodiment of the disclosure applied onto a display screen.

The comparison diagram showing situations with or without the display screen film provided by the embodiment of the disclosure applied to a display screen is as shown in FIG. 3. As shown in FIG. 3(a), without the film, the surface of the display screen emits an omni-directional 180-degree visual angle of light; as shown in FIG. 3(b), with the film, after the light emitted from the surface of the display screen passes through the film shown in FIG. 1, since the film has a guiding function for the light emitted from the surface of the display screen, the light emitted from the upper surface of the film is changed to be in a smaller scope almost perpendicular to the display screen. In this way, in the condition that the whole display screen brightness is reduced to ⅓ of the original brightness, it is ensured that energy saving can be achieved without the reduction of a user's visual perception within the smaller scope, thereby improving the endurance capability of mobile terminal.

In addition, growing an orientated carbon nanotube layer on a quartz glass layer can be implemented by using the electrical, magnetic and other properties of the carbon nanotube itself, for example, high-molecular induced orientation method, electrical-field induced orientation method, magnetic-field induced orientation method and so on.

The above are the preferred embodiments of the disclosure and are not intended to limit the scope of protection of the disclosure.

What is claimed is:

1. A preparation method for a display screen film, comprising:

growing an orientated carbon nanotube layer on a quartz glass layer;

absorbing, by the quartz glass layer, incident light, and enabling the incident light to reach the orientated carbon nanotube layer; and refracting, by gaps between orientated carbon nanotubes on the orientated carbon nanotube layer, the incident light;

wherein the orientated carbon nanotube layer is grown on the quartz glass layer using hydrogen-free chemical vapour deposition, comprises:

taking $Fe(C_5H_5)_2$ as a catalyst, acetylene as a carbon source, nitrogen as carrier gas, the quartz glass layer as a substrate which is put into a multi-temperature area horizontal column reactor, a quartz tube as a reaction chamber; wherein a ratio between an amount of the catalyst and a flow rate of the carbon source is 1 g:100 mL/min, a flow rate ratio between the carrier gas and the carbon source is $N_2:C_2H_2=2:1$ to 4:1, a total flow rate of gas is small or equal to 300 mL/min;

increasing temperature of the reactor to 700-800° C., directing the nitrogen and acetylene into two tube inlets of the reaction chamber with a flow rate of 100-300 mL/min for the nitrogen and a flow rate of 40-100 mL/min for the acetylene in order to generate the orientated carbon nanotube layer.

2. The method according to claim 1, wherein carbon nanotubes of the orientated carbon nanotube layer have orientated growth directions of 90°±15°.

3. The method according to claim 1, wherein growing the orientated carbon nanotube layer on the quartz glass layer is: vertically growing, on the quartz glass layer, carbon nanotubes for refracting the incident light.

4. The method according to claim 1, wherein the gaps between carbon nanotubes on the oriented carbon nanotube layer have a size in the range of 400 nm to 700 nm.

5. The method according to claim 1, wherein carbon nanotubes on the oriented nanotube layer have a diameter in the range of 20 nm to 80 nm.

6. An energy saving method using a display screen film, comprising:

growing an orientated carbon nanotube layer on a quartz glass layer;

forming the quartz glass layer having the orientated carbon nanotube layer grown thereon into the display screen film, and attaching the display screen film onto the surface of a display screen;

absorbing, by the quartz glass layer, incident light from the surface of the display screen and enabling the incident light to reach the orientated carbon nanotube layer; and refracting, by gaps between orientated carbon nanotubes on the orientated carbon nanotube layer, the incident light to enable the light to emit out vertically after passing through the display screen film;

wherein the orientated carbon nanotube layer is grown on the quartz glass layer using hydrogen-free chemical vapour deposition, comprises:

taking $Fe(C_5H_5)_2$ as a catalyst, acetylene as a carbon source, nitrogen as carrier gas, the quartz glass layer as a substrate which is put into a multi-temperature area horizontal column reactor, a quartz tube as a reaction chamber; wherein a ratio between an amount of the catalyst and a flow rate of the carbon source is 1 g:100 mL/min, a flow rate ratio between the carrier gas and the carbon source is $N_2:C_2H_2=2:1$ to 4:1, a total flow rate of gas is small or equal to 300 mL/min;

increasing temperature of the reactor to 700-800° C., directing the nitrogen and acetylene into two tube inlets of the reaction chamber with a flow rate of 100-300 mL/min for the nitrogen and a flow rate of 40-100 mL/min for the acetylene in order to generate the orientated carbon nanotube layer.

7. The method according to claim 6, wherein growing the orientated carbon nanotube layer on the quartz glass layer is: vertically growing, on the quartz glass layer, carbon nanotubes for refracting the incident light.

* * * * *